(12) United States Patent
Salecker et al.

(10) Patent No.: US 6,213,911 B1
(45) Date of Patent: *Apr. 10, 2001

(54) POWER TRAIN WITH AUTOMATED TRANSMISSION

(75) Inventors: Michael Salecker, Bühl; Jochen Stinus, Inzlingen; Martin Zimmermann, Sasbach, all of (DE)

(73) Assignee: LuK Getriebe-Systeme GmbH, Buhl/Baden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,101

(22) Filed: Oct. 10, 1997

(30) Foreign Application Priority Data

Oct. 12, 1996 (DE) ............................................. 196 42 188

(51) Int. Cl.[7] .............................. F16H 59/54; F16H 59/00
(52) U.S. Cl. ............................................. 477/97; 477/174
(58) Field of Search ........................... 477/97, 166, 174; 74/335; 701/53, 65

(56) References Cited

U.S. PATENT DOCUMENTS

| | | | |
|---|---|---|---|
| 3,937,105 | * 2/1976 | Arai et al. | 477/906 X |
| 4,558,612 | * 12/1985 | Shimizu et al. | 477/97 |
| 4,718,307 | * 1/1988 | Yabe et al. | 74/335 X |
| 4,817,471 | * 4/1989 | Tury | 74/335 X |
| 4,854,194 | * 8/1989 | Kaneko et al. | 477/97 |
| 4,892,014 | * 1/1990 | Morrell et al. | 701/53 X |
| 4,939,657 | * 7/1990 | Imai et al. | 701/65 X |
| 4,966,049 | * 10/1990 | Takahashi | 701/65 X |
| 5,790,969 | * 8/1998 | Mckee | 74/335 X |
| 5,875,679 | * 3/1999 | Salecker et al. | 74/335 |

* cited by examiner

Primary Examiner—Charles A Marmor
Assistant Examiner—Ha Ho
(74) Attorney, Agent, or Firm—Darby & Darby

(57) ABSTRACT

An electronic control unit for an automated transmission and/or an automated clutch in the power train of a motor vehicle is connected with one or more sensors denoting one or more activities by the operator of the vehicle. The control unit can become operative in response to a signal denoting the actuation of a brake and/or in response to a signal denoting that the ignition system of the vehicle has been operated to start the engine.

39 Claims, 5 Drawing Sheets

POWER TRAIN WITH AUTOMATED TRANSMISSION

BACKGROUND OF THE INVENTION

The invention relates to motor vehicles in general, and more particularly to improvements in motor vehicles having power trains embodying automated torque transmitting systems (such as friction clutches) and/or automated variable speed transmission systems. Still more particularly, the invention relates to improvements in power trains wherein the automated system or systems is or are actuated in response to commands from a control unit (such as a microprocessor) which receives signals from monitoring means including one or more sensors.

It is already known to render the control unit operative in response to activation of the ignition system for the engine in the power train of a motor vehicle. Signal or signals from the sensor means which monitors the ignition system causes or cause the control unit to change the condition of the clutch (e.g., by way of a hydraulic, mechanical or other suitable actor) and/or to change the ratio of the transmission (e.g., by way of another actor). The arrangement can be such that the control unit becomes operative in automatic response to actuation of the ignition system in a sense to start the engine.

Motor vehicles of the above outlined character are disclosed in U.S. Pat. No. 4,892,014 granted Jan. 9, 1990 to Morell et al. for "ELECTRONIC CONTROLLER FOR AUTOMATIC TRANSMISSION". The disclosure of this patent is incorporated herein by reference. Morell et al. disclose one or more microprocessors serving to control an automatic transmission and being designed to change its or their condition from inoperative (idle) to operative (ready for use) in response to completion of the ignition circuit by an ignition key or a switch. A drawback of the patented apparatus is that, if the operator of the motor vehicle desires to carry out one or more particular (specific) operations or steps which can be carried out only while the microprocessor(s) is or are operative, it is invariably necessary to change the condition of the mcroprocessor(s) from inoperative to operative before the operator of the motor vehicle can proceed with the carrying out of the particular (specific) operations or steps. Thus, an operation which can be carried out only while the microprocessor(s) of Morell et al. is or are operative must be preceded by a manipulation of the ignition key or of a switch if the operator of the motor vehicle desires to carry out such operation while the microprocessor(s) is or are inoperative. This is often inconvenient to the operator, especially when it is necessary to carry out the particular (specific) operation or operations on short notice, i.e., either immediately or with a minimum of delay.

OBJECTS OF THE INVENTION

An object of the invention is to provide a motor vehicle with a novel and improved arrangement for actuating one or more automated systems (such as a friction clutch and/or a change-speed transmission) in the power train of the motor vehicle.

Another object of the invention is to provide an arrangement which renders it possible to perform, without the need for a preceding compulsory change of the condition of one or more microprocessors and/or other suitable control units for the automated system or systems, one or more operations which, in accordance with heretofore known proposals including the teaching of Morell et al., are possible only when the microprocessor(s) is or are operative.

A further object of the invention is to provide a power train whose manipulation is less cumbersome to the operator of the motor vehicle embodying the power train and less time consuming than the manipulation of power trains in accordance with heretofore known proposals.

An additional object of the invention is to provide a power train whose manipulation is at least as safe and reliable as the manipulations in accordance with heretofore known teachings.

Still another object of the invention is to provide a novel and improved method of actuating or manipulating a microprocessor-controlled power train in a passenger car or in another motor vehicle.

A further object of the invention is to provide a novel and improved control unit for an automated torque transmitting system and/or an automated gear ratio changing transmission system in the power train of a motor vehicle.

Another object of the invention is to provide a vehicle which embodies the above outlined power train and the control unit(s) for one or more automated systems of the power train.

An additional object of the invention is to provide a novel and improved combination of one or more electronic control units, one or more sensors, and one or more actuating means for regulating the operation of one or more automated systems in the power train of a motor vehicle.

Still another object of the invention is to provide a motor vehicle wherein the condition of one or more control units for the friction clutch and/or automated transmission of the power train can be altered without necessitating any attention from the operator of the motor vehicle.

A further object of the invention is to provide a relatively simple, compact and inexpensive control arrangement for one or more automated constituents or systems in the power train of a motor vehicle.

Another object of the invention is to provide an arrangement of the above outlined character which can employ readily available standard constituents, such as ignition systems, sensors, switches, actuating means and/or others, so that it can be assembled at a relatively (or even surprisingly) low cost to simplify the task of the operator without, however, endangering the occupant or occupants of the motor vehicle.

SUMMARY OF THE INVENTION

One feature of the invention resides in the provision of a motor vehicle which comprises a power train including a prime mover, an automatically actuatable transmission and a torque transmitting system. The vehicle further comprises at least one control unit switchable between an operative condition where the at least one control unit is in an on state and an inoperative condition where the at least one control unit is in an off state, actuating means operating between the at least one control unit and the transmission to actuate the transmission in the operative condition of the at least one control unit, a starting device for the prime mover (such starting device has activated and idle conditions and is operative to change the condition of the at least one control unit in response to a change between its actuated and idle conditions), and means for monitoring the activities of the operator of the motor vehicle and for transmitting to the at least one control unit signals which effect a change from inoperative to operative condition in response to detection of at least one particular activity of the operator.

The torque transmitting system can include a friction clutch which can be installed in the power train in such a way that it connects an output element of the prime mover with an input element of the automated transmission.

The aforementioned particular activity can involve the actuation of a brake, such as a foot-operated brake or a parking brake.

The monitoring means can include at least one first sensor which serves to transmit the aforementioned signals, and at least one additional sensor.

If the prime mover of the motor vehicle includes a combustion engine, the aforementioned starting device can comprise an ignition system for the engine.

If the torque transmitting system of the power train is an automatically actuatable system, the vehicle can further comprise an additional control unit and second actuating means interposed between the additional control unit and the automated torque transmitting system. The additional control unit serves to actuate the automated torque transmitting system by way of the second actuating means in response to signals from the at least one control unit.

The actuating means for the automated transmission is or can be arranged to actuate the transmission in response to a change from inoperative condition to operative condition of the at least one control unit.

The at least one control unit is or can be arranged to remain in the operative condition for a predetermined interval of time following a change from its inoperative condition to its operative condition in response to the transmission of a signal by the monitoring means. Still further, the arrangement can be such that, when the starting device assumes or dwells in its idle condition, the at least one control unit can remain in the operative condition for the duration of signal transmission by the monitoring means.

The automated transmission can be designed in such a way that it is manually shiftable into a plurality of gears. The signal which effects a change from inoperative to operative condition of the at least one control unit can be indicative of manual shifting of the transmission into one of the plurality of gears by the operator of the motor vehicle, i.e., such signal is clearly indicative of a particular activity of the operator.

Furthermore, if the transmission is designed to be shiftable into any one of several gears (such as parking, reverse, neutral and several forward gears), a signal which effects a change from inoperative to operative condition of the at least one control unit is or can be indicative of the momentary (i.e., then effective) gear of the transmission.

If the transmission is shiftable into a plurality of gears and the torque transmitting system is an automatically disengageable system, the motor vehicle can further comprise additional actuating means for the torque transmitting system and the at least one control unit can include means for disengaging the torque transmitting system by way of the additional actuating means in response to a signal denoting an intention by the operator to shift the transmission from a particular gear into a different gear, i.e., the automated torque transmitting system is automatically disengaged at least for the duration of shiting the transmission into a different gear.

At least one sensor of the monitoring means can be designed to be effective for the generation of signals in the inoperative condition of the at least one control unit. Furthermore, at least one sensor of the monitoring means can be designed and installed to transmit signals for the duration of one or more particular activities of the operator of the motor vehicle, and the at least one control unit can remain operative only during transmission of signals by the at least one sensor. Alternatively, the at least one control unit can remain operative during transmission of signals by the at least one sensor as well as for intervals following transmission of such signals; each such interval can take up a predetermined period of time (i.e., the duration of each such interval can be the same).

The monitoring means can comprise one or more analog sensors and/or one or more digital sensors and/or one or more sensors which include or constitute switches.

In accordance with a presently preferred embodiment, the monitoring means can include means (such as one or more sensors and/or switches) for generating signals which denote at least one of (a) the condition of a parking brake, (b) the position of a brake pedal, (c) actuation of a door switch, (d) the position of a hood, (e) the position of a trunk cover, (f) the condition of an alarm system, (g) the condition of a seat switch, (h) the position of the gas pedal, (i) the position of a light control switch, (j) the condition of a headlamp flasher, (k) the condition of the horn, (l) the condition of a radio receiver, (m) the position of a gear selecting element (such as a lever) for the transmission, and (n) the position or condition of any other adjustable constituent of the vehicle which can be manipulated by the operator.

Another feature of the invention resides in the provision of a motor vehicle which comprises a power train including a prime mover, an automatically actuatable transmission and an automatically actuatable torque transmitting system. The vehicle further comprises at least one control unit switchable between an operative on where the at least one control unit is in an on state and an inoperative on where the at least one control unit is in an off state, first actuating means which operates between the at least one control unit and the transmission to actuate the transmission in the operative condition of the at least one control unit, second actuating means which operates between the at least one control unit and the torque transmitting system to actuate the torque transmitting system in the operative condition of the at Least one control unit, and means for monitoring the activities of the operator of the motor vehicle. The monitoring means includes a first sensor which is arranged to transmit to the at least one control unit first signals serving to effect a change from inoperative condition to operative condition in response to detection of at least one first activity of the operator, and a second sensor which serves to transmit to the at least one control unit second signals serving to effect the aforementioned change from inoperative condition to operative condition in response to detection of at least one second activity of the operator.

The torque transmitting system can include an engageable and disengageable clutch (such as a friction clutch), and the at least one first activity can involve the actuation of a brake. The at least one second activity can involve a change of the condition of a starting device for the prime mover, and such device can have activated and idle conditions. If the prime mover of the power train includes a combustion engine, the starting device can include an ignition system for such engine.

The first actuating means can be constructed and mounted to actuate the transmission in response to a change from inoperative to operative condition of the at least one control unit.

The at least one control unit can be arranged to remain in the operative condition for predetermined intervals of time following a change from the inoperative condition in response to transmission of a signal by the monitoring means.

The at least one second activity can involve a change of the condition of the aforementioned starting device for the prime mover, and such starting device has activated and idle conditions. The arrangement can be such that, while the starting device assumes its idle condition, the at least one control unit remains in the operative condition for the duration of signal transmission by the monitoring means.

If the transmission is of the type which is manually shiftable into any one of a plurality of different gears, a signal which effects a change from inoperative condition to operative condition of the at least one control unit can be indicative of manual shifting of the transmission into one of the plurality of different gears by the operator of the vehicle.

Still further, and if the transmission is shiftable into any one of a plurallity of different gears, a signal which effects a change from inoperative to operative condition of the at least one control unit can be indicative of the momentary gear of the transmission.

If the transmission is shiftable into a plurality of different gears and the torque transmitting system is an automatically disengageable friction clutch or the like, the at least one control unit can include means for disengaging the torque transmitting system by way of the second actuating means in response to a signal denoting an intention by the operator to shift the transmission into a different gear.

At least one sensor of the monitoring means can be designed to generate signals in the inoperative condition of the at least one control unit. Furthermore, at least one sensor of the monitoring means can be set up to transmit signals for the duration of activity of the operator of the vehicle, and the at least one control unit can remain operative only during transmission of signals by such at least one sensor. Alternatively, at Least one sensor of the monitoring means can be set up to transmit signals for the duration of activity of the operator, and the at least one control unit can remain operative during and for intervals following transmission of signals by the at least one sensor. Such intervals can take up predetermined (e.g., identical) periods of time.

As already mentioned above, the monitoring means can include one or more analog sensors and/or one or more digital sensors and/or one or more sensors which include or constitute switches.

Still further, and as also mentioned hereinbefore, the monitoring means can include sensors which are set up to generate signals denoting one or more of the activities or consequences of activities (a) to (n) of the operator of the motor vehicle.

An additional feature of the invention resides in the provision of a method of actuating at least one of an automatically actuatable torque transmitting system and an automatically actuatable transmission system in a power train of a motor vehicle by way of at least one control unit (such as a microprocessor) which has operative and inoperative conditions, which is connected with at least one of the automatically actuatable systems by at least one actuating means, and which receives signals from sensors arranged to monitor various activities of the operator of the motor vehicle. The method comprises the steps of changing the condition of the at least one control unit from inoperative to operative in response to a sensor signal denoting a starting by the operator of a prime mover (e.g., an internal combustion engine) of the vehicle, and changing the condition of the at least one control unit from inoperative to operative in response to a sensor signal denoting an activity of the operator other than starting of the prime mover.

For example, the other activity can involve the actuation of a brake in the motor vehicle.

The novel features which are considered as characteristic of the invention are set forth in particular in the appended claims. The improved motor vehicle itself, however, both as to its construction and the mode of assembling, installing and operating its power train, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
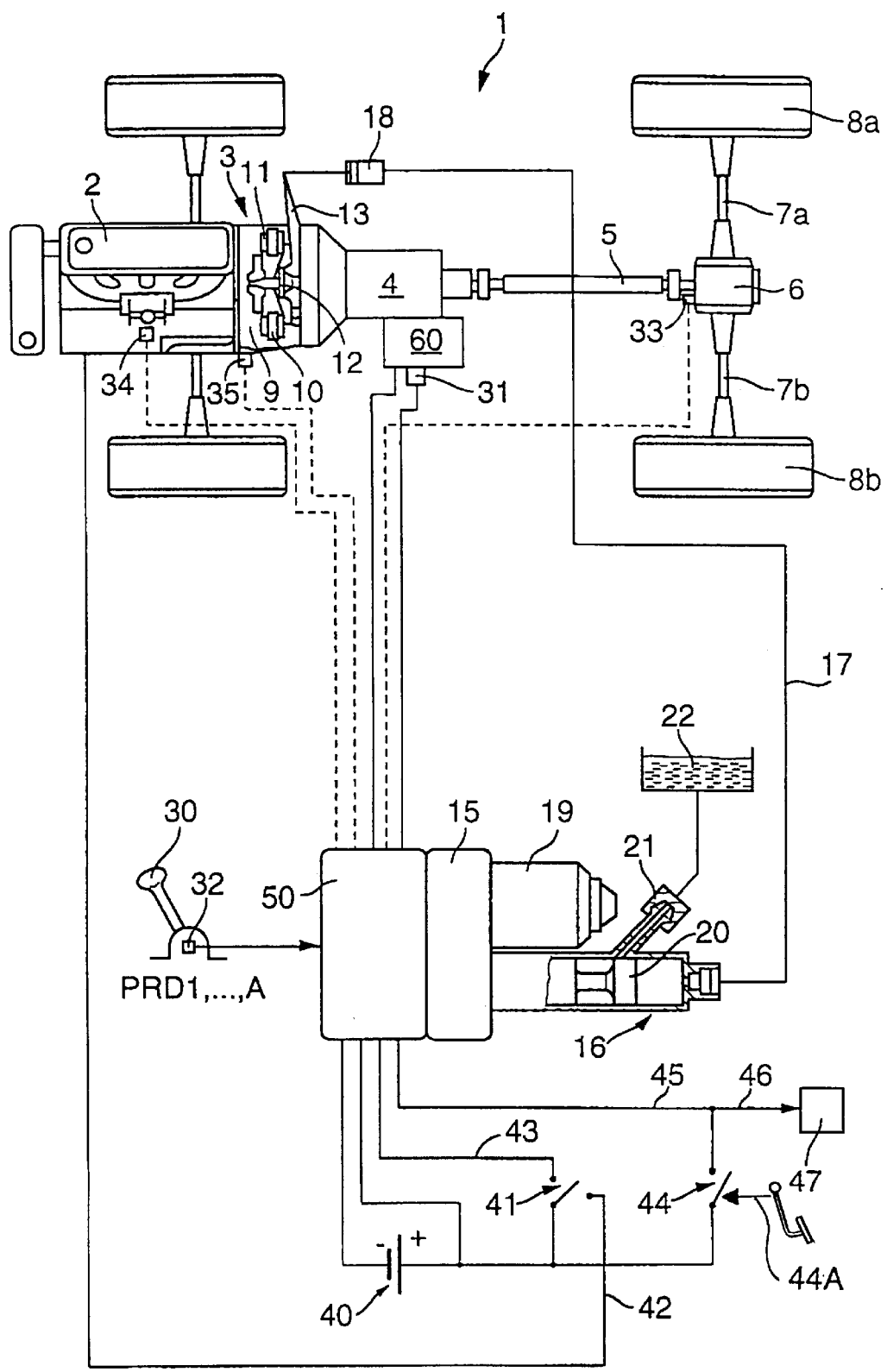
FIG. 1 is a schematic representation of certain component parts of a motor vehicle wherein the power train can be controlled or regulated in accordance with one embodiment of the invention.

FIG. 1 shows certain relevant component parts of a motor vehicle 1 having a power train including a prime mover 2 (such as a combustion engine or a hybrid drive utilizing an electric motor), an automated transmission 4, and an automated torque transmitting system 3 (such as a friction clutch and hereinafter referred to as clutch for short) which is installed to transmit torque between a rotary output element (e.g., a camshaft or a crankshaft) of the prime mover 2 (hereinafter called engine) and a rotary input element of the transmission 4. The output element of the transmission 4 constitutes or drives a shaft 5 which drives a differential 6 for two driven axles 7a, 7b respectively carrying driven wheels 8a, 8b.

The illustrated clutch 3 comprises a flywheel or counterpressure plate 9 which can be driven by the output element of the engine 2, an axially movable pressure plate 10 which rotates with the counterpressure plate 9, a clutch plate or clutch disc 11 having friction linings between the plates 9, 10 and arranged to rotate the input element of the transmission 4, a disengaging bearing 12 which can act upon and can thus change the conicity of a diaphragm spring (not referenced) for the pressure plate 10, and a disengaging fork 13 for the bearing 12. The actuating means 15 between an electronic control unit 50 and the fork 13 of the clutch 3 is a fluid-operated actor which comprises a master cylinder 16 controlled by a gearing (not specifically shown) in response to signals from the control unit 50, a slave cylinder 18 which transmits motion to the fork 13, and a conduit 17 between the cylinders 6, 18. The actuating means 15 (hereinafter called actor) further comprises a reservoir 22 containing a supply of pressurized hydraulic fluid, and a snifting valve 21 between an outlet of the reservoir 22 and the master cylinder 16. An electric motor 19 of the actor 15 can impart motion to the piston 20 of the master cylinder 16 by way of the aforementioned gearing. The actor 15 can cause the clutch 3 to assume a fully disengaged condition, a fully engaged condition (in which the clutch disc 11 is compelled to share all angular movements of the plates 9, 10) as well as a number of intermediate conditions in which the clutch 3 operates with a selected amount of slip between the plates 9, 10 on the one hand and the clutch disc 11 on the other hand.

The control unit 50 can include at least one microprocessor with power electronics as well as with control or regulating electronics for the actor 15. This control unit 50 is integrated into the actor 15 (or vice versa); however, it is equally possible to install the control unit 50 and the actor 15 in discrete housings or casings.

The control unit 50 further serves to transmit signals to a second actuating means or actor 60 which is arranged to actuate the automated transmission 4. For example, the actor 60 can include (in a manner known per se) electric motors and gearings which serve to shift the transmission 4 into a selected one of several gears such as parking (P), reverse (R), direct (D), first forward (1), and so forth. The case of the transmission 4 contains several internal components which can be manipulated by the actor 60 to shift the transmission into a selected gear. In addition, the vehicle 1 is equipped with a manually operable member (such as a lever) 30 which can be manipulated by the operator of the vehicle in order to transmit to the control unit 50 signals denoting the operator-selected gears for the transmission 4. The various positions of the lever 30 are monitored by a sensor 32 which transmits corresponding signals to the respective input of the control unit 50.

Another sensor 31 is associated with the actor 60 and/or with the internal components of the transmission 4 and serves to transmit to the corresponding input of the control unit 50 signals denoting the actual (momentary) setting (gear) of the transmission. The sensor 31 (or an additional sensor) can transmit to the control unit 50 one or more additional signals denoting, for example, the intent of the operator of the vehicle 1 to shift the transmission 4 into a particular gear. However, such function can also be performed by the aforementioned sensor 32 which monitors the positions of and/or the magnitude of forces applied to the gear selecting lever 30 for the transmission 4.

The monitoring means which transmits signals to the control unit 50 includes the aforementioned sensors 31, 32 as well as at least one additional sensor. FIG. 1 shows a sensor 33 which transmits signals denoting the RPM of the shaft 5 and/or of a rotary element of the differential 6 and/or of at least one of the axles 7a, 7b and/or of at least one of the wheels 8a, 8b. A sensor 34 is provided to monitor the position of the mobile valving element of a throttle valve for the engine 2, and a further sensor 35 serves to transmit signals denoting the RPM of a rotary part (such as the aforementioned output shaft) of the engine 2.

The sensor 31 can constitute an analog sensor which is arranged to transmit to the control unit 50 signals indicating the position(s) of one or more mobile internal parts of the transmission 4 and/or the selected gear of the transmission. Thus, the control unit 50 can take into consideration the momentary setting (gear) of the transmission 4. Furthermore, an analog sensor 31 can perform the additional function of informing the control unit 50 of the operator's intent to shift into a different gear as well as of indicating the gear which is being selected by the operator.

Figure 1A:
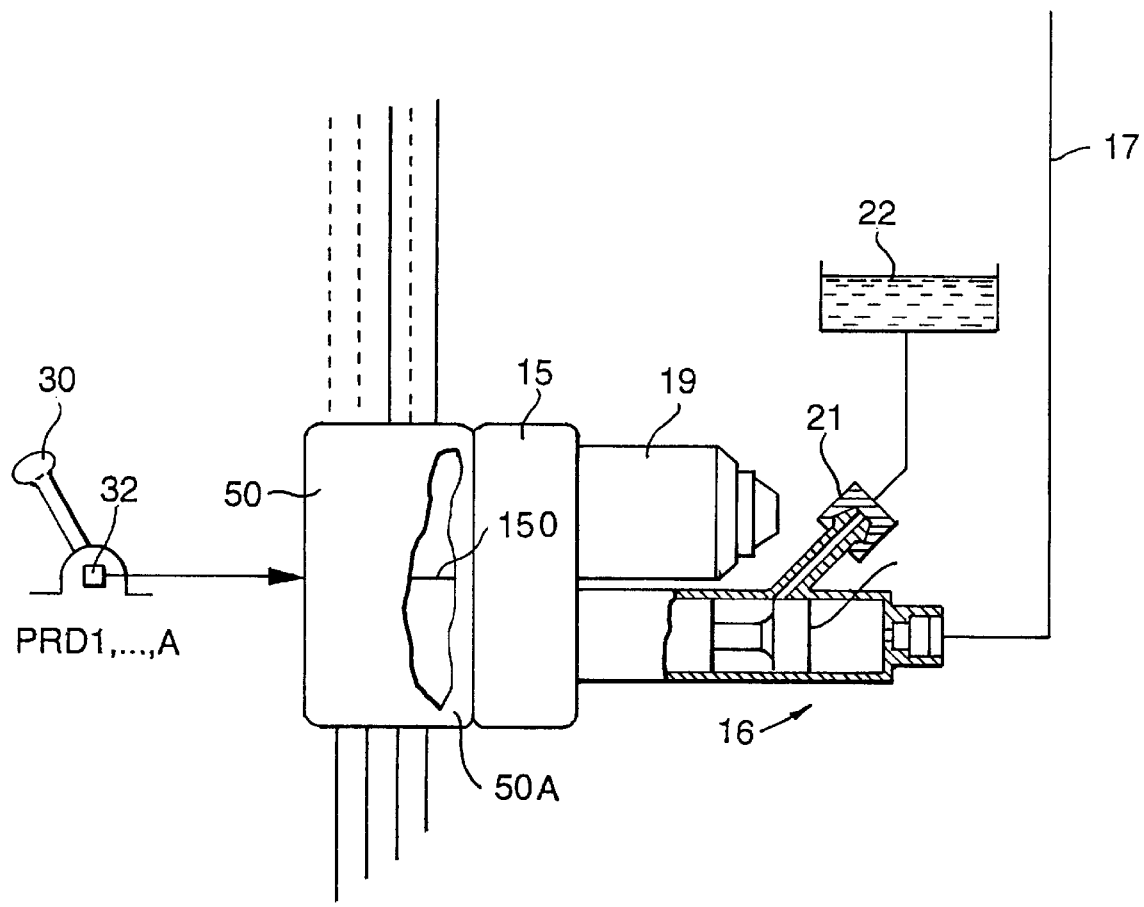
FIG. 1a illustrates a modification of the power train shown in FIG. 1.

It is possible to employ a composite control unit which includes two or more sections 50, 50A disposed in discrete housings or casings, for example, a first section 50A for the actor 15 and a second section 50 for the actor 60 (see FIG. 1a). Such sections are connected with one another at 150.

The energy source for the actor 15 and/or 60 includes a battery 40, and such battery is preferably uninterruptedly connected with the actor 15 or 60 or with the actors 15 and 60. The reference character 41 denotes a component part of a starting device, such as a multistage starter switch or sensor which is connected with the actual ingnition system for the engine 2 by conductor means 42. The ignition system can be operated by a customary key which closes the sensor or switch 41 in order to start the engine 2 and to change (via lead 43) the condition of the control unit 50 from an inoperative to an operative condition. The control unit 50 transmits an appropriate signal to the actor 15 for the clutch 3. In other words, the clutch 3 can be actuated by the actor 15 in response to starting of the engine 2 as a result of closing of the switch 41 in the monitoring means for the control unit 50.

Another sensor of the monitoring means includes a switch 44 which can be closed in response to actuation of a brake pedal 44A. This, too, can induce the control unit 50 to change its condition from inoperative to operative and to actuate the transmission 4 via actor 60 and/or the clutch 3 by way of the actor 15. The signal-transmitting connection between the switch 44 and the control unit 50 for the actors 15 and 60 includes a conductor 45. The circuit for a brake light 47 can be completed via switch 44 and a further conductor 46 branching off the conductor 45.

If the ignition system (starting device) for the engine 2 is off, and the operator of the vehicle 1 decides to close the switch 44 by depressing the brake pedal 44A (or by actuating the handle of the parking brake, not shown) while the ignition system for the engine is still off (i.e., while the switch 41 is open), the switch 44 transmits a signal to the control unit 50 via conductor 45 so that the condition of the control unit 50 is changed from inoperative to operative while the ignition system (switch 41) for the engine is still in an idle condition. In other words, the clutch 3 can react (e.g., automatically assume a fully disengaged condition in which the plates 9, 10 can turn relative to the clutch disc 11 and/or vice versa) while the engine 2 is still idle. Such disengagement of the clutch 3 is advisable or desirable before the operator begins to pivot the lever 30 for the purpose of selecting a particular gear for the transmission 4.

It is to be noted that a hydraulically operated actor 15 or 60 is but one of a number of different actors which can be utilized in the power train of the present invention. For example, at least the actor 15 can be replaced with a pneumatically operated or fully mechanical actor. Thus, the connection between the control unit 50 and the fork 13 and/or bearing 12 of the clutch 3 can comprise a mechanical linkage or a flexible motion transmitting arrangement such as one or more Bowden cables.

Furthermore, the brake-operated switch 44 is but one of a number of operator-manipulatable constituents of the motor vehicle 1 which can be operated by the driver in order to transmit a signal via conductor 45 on to the control unit 50 for the purpose of changing the condition of such control unit, particularly from inoperative to operative. By way of example, the character 44 can denote a seat switch, a gas pedal monitoring switch, a switch or sensor which is closed or opened in response to locking or unlocking and closing or lifting of the hood and/or in response to unlocking and opening or closing and locking of the trunk cover, in response to deactivation of an alarm system, in response to deactivation of a central locking and unlocking device and/or in response to manipulation of many other constituents of the motor vehicle which can be (directly or indirectly) operated by the driver or by another authorized operator.

Figure 2:
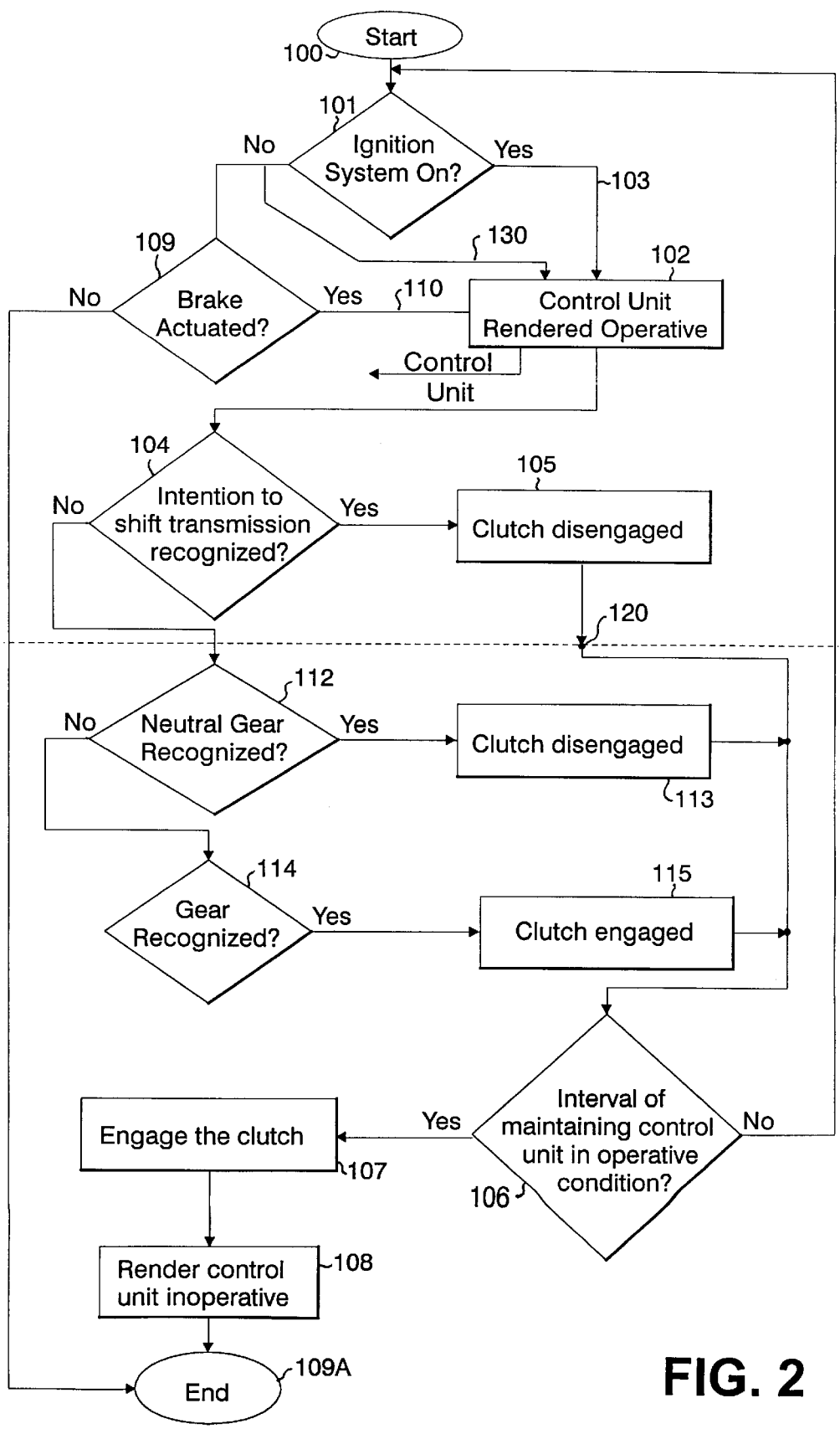
FIG. 2 is a block diagram representing one presently preferred routine which can be carried out by the controls for the power train shown in FIG. 1.

The block diagram of FIG. 2 represents one mode of utilizing the control unit 50 (such as a microprocessor) for the practice of the present invention. A routine is started at 100, and the block 101 denotes the step of ascertaining (by monitoring the position of the switch 41) whether or not the starting device (ignition system) for the engine 2 is on. If the answer is in the affirmative, a signal is transmitted via branch 103 (corresponding to the conductor 43) to render the control unit 50 operative (at 102). If the sensor 32 and/or the sensor 31 transmits a signal indicating an intention by the operator to shift the transmission 4 into a particular gear (see the block 104 in FIG. 2) by way of the lever 30 or indicating that such shifting of the transmission 4 is already carried out, the clutch 3 is disengaged (block 105) via actor 15. The block 105 denotes the conventional operation of the clutch 3 by the operator until the vehicle 1 is brought to a halt by turning off the engine 2 in response to opening of the switch 41 (i.e., in response to rendering the starting device inoperative). This is indicated at 120. The block 106 denotes a certain interval of delay prior to engagement of the clutch 3 (as at 107) which is followed by changing the condition of the control unit 50 to inoperative (as at 108), and the routine is terminated at 109A.

If the starting device (ignition system operated by the switch 41) is not activated at 101, the operator can render the control unit 50 operative by depressing the brake pedal 44A to close the sensor or switch 44 (block 109 in the diagram of FIG. 2). The arrow 110 denotes in FIG. 2 that the control unit 50 (block 102) is rendered operative in response to actuation of the brake pedal 44A, i.e., in response to closing of the switch or sensor 44.

If the step denoted by the block 104 indicates that the sensor 31 and/or 32 failed to transmit a signal denoting an intent by the operator to shift the transmission 4 into a different gear, the control unit 50 is informed or assumes that the transmission is in neutral gear (see the block 112) and the clutch 3 is disengaged via actor 15 (block 113 in FIG. 2). If the transmission 4 is not in neutral gear (see the block 114 in FIG. 2), the clutch 3 is engaged by the actor 15 (block 115). Such engagement of the clutch 3 is desirable in order to ensure that the vehicle 1 cannot start to roll. However, if the transmission 4 is in neutral gear (block 112 in FIG. 2), the clutch 3 is disengaged (block 113) because it is reasonable to assume that, prior to leaving the vehicle, the operator will desire to shift the transmission into a selected gear (parking) in order to prevent any rolling of the vehicle. If the lever 30 is not actuated in a subsequent step, i.e., if the sensor 31 and/or 32 fails to transmit a signal denoting an intention to shift the transmission 4 into a selected gear, the clutch 3 is engaged (block 107) after elapse of a given interval (block 106), the control unit 50 is rendered inoperative (block 108), and the routine is terminated at 109A.

The arrow 130 indicates the routine for rendering the control unit 50 operative when the control unit was inoperative, for example, following or in the course of a typical vehicle parking operation.

Referring again to the block 109 in the diagram of FIG. 2, it is not imperative that the brake pedal 44A or an equivalent brake actuating element be utilized to generate a signal which renders the control unit 50 operative as a result of closing of the switch or sensor 44 or actuation of another suitable sensor. As already mentioned above, the switch 44 is but one of a number of sensors which can be resorted to in order to change the condition of the control unit 50 or of at least one portion or section of a composite control unit. Thus, the condition of the control unit 50 can be changed in response to the carryig out of any one of a number of various activities by the operator of the motor vehicle including, for example, actuation of a central vehicle locking system, depression of the gas pedal, occupying the driver's seat, closing a door, closing the hood, closing the trunk and/or others. Such signal generating sensors are well known in the art of motor vehicles. Furthermore, reference may be had to U.S. Pat. No. 4,892,014 to Morell et al.

Figure 3:
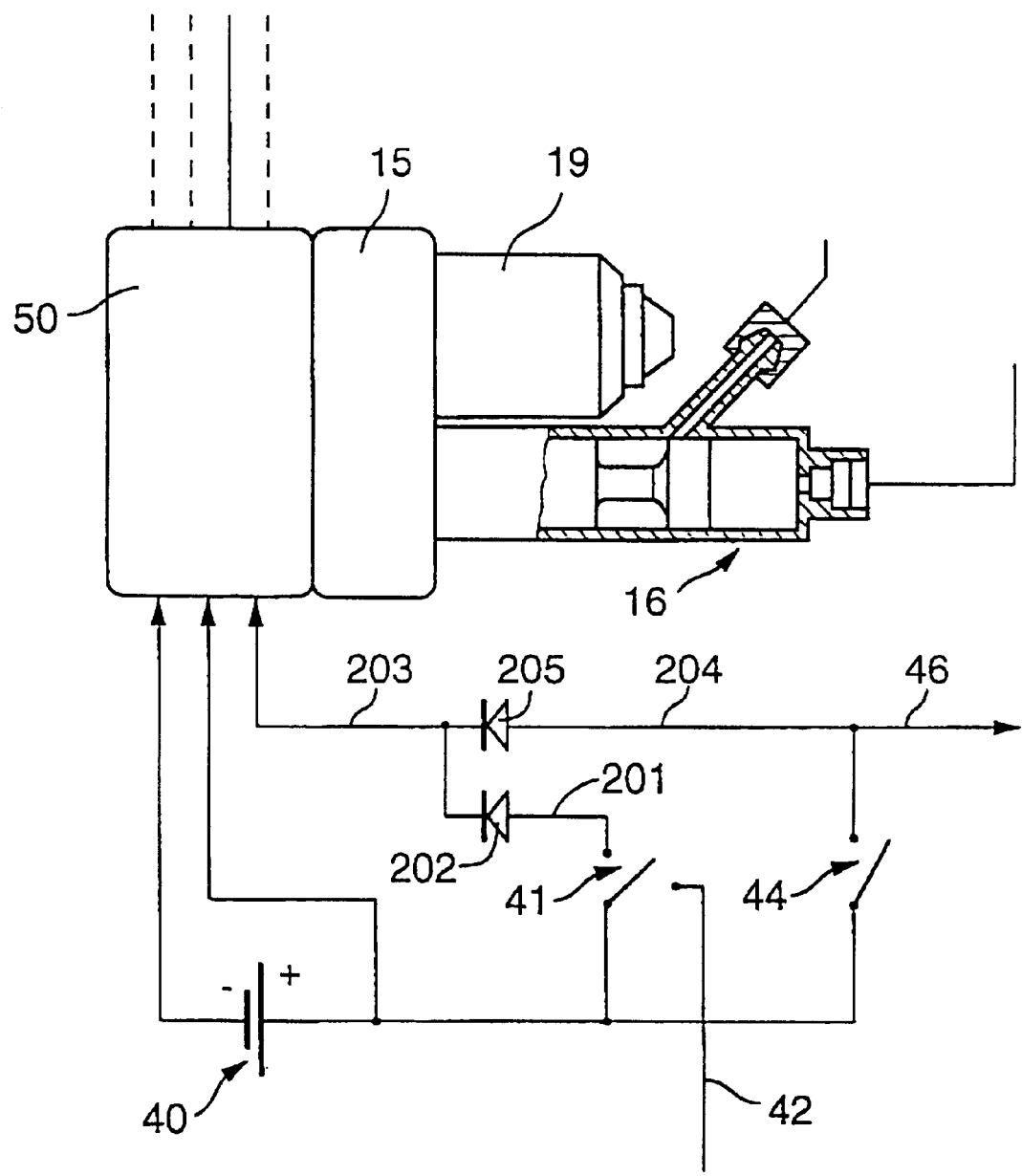
FIG. 3 illustrates a portion of a modified motor vehicle.

FIG. 3 shows a portion of a modified motor vehicle wherein the control unit 50 is connected with the actor 15 which can be identical with the actor 15 of FIG. 1. The energy source 40 is connected with one input of the control unit 50, and the latter is further in circuit with the switches 41 and 44. Closing of the switch 41 by the operator of the motor vehicle embodying the structure of FIG. 3 entails the generation of a signal via conductor a diode 202 and a conductor 203. Closing of the switch 44 (e.g., by a brake pedal corresponding to the brake pedal 44A of FIG. 1) entails the transmission of a signal via conductor 204, a diode 205 and conductor 203. The purpose of the conductors 42 and 46 shown in FIG. 3 is the same as the purpose of the similarly referenced parts in the vehicle 1 of FIG. 1.

The diodes 202 and 205 ensure that the conductor 203 can transmit only one signal at a time.

Figure 4:
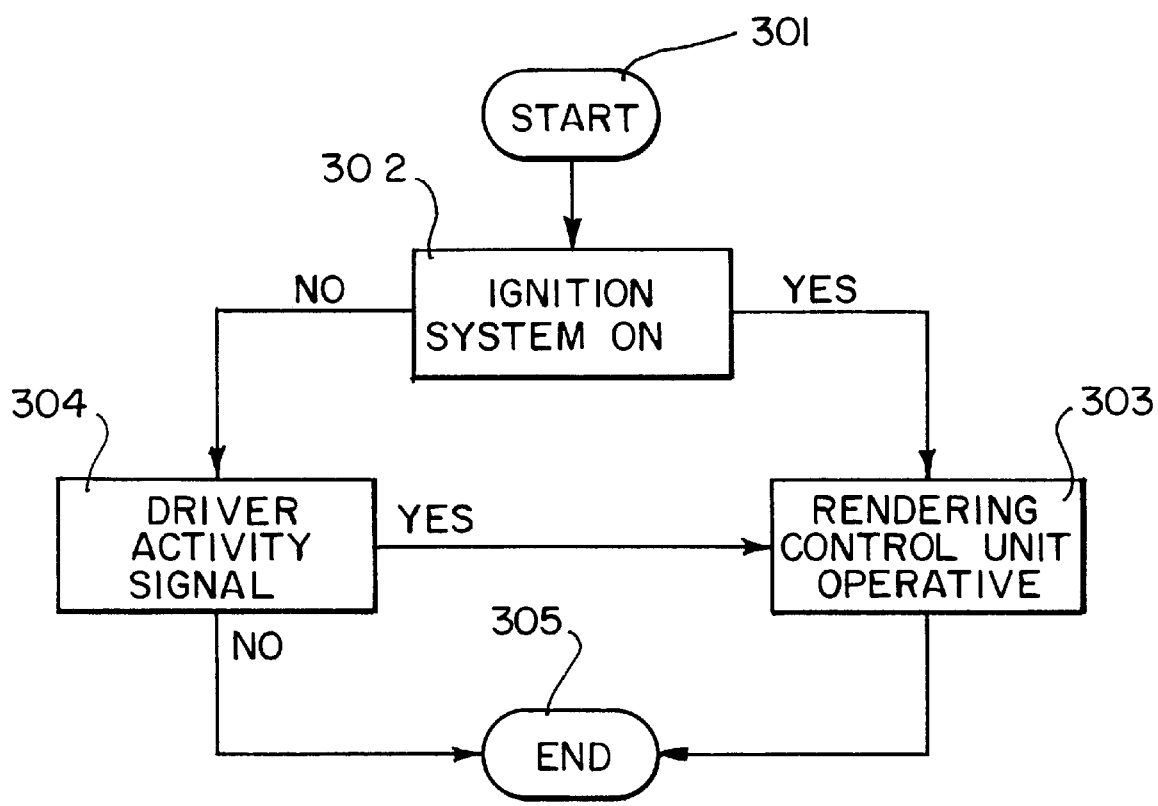
FIG. 4 is a block diagram showing a modified (repeatable) routine.

The block diagram of FIG. 4 represents a modified routine which can be carried out in connection with the operation of a power train in a motor vehicle. The routine is started at 301 and is repeated essentially cyclically at predetermined intervals Δt. The block 302 denotes a determination whether the starting device (e.g., an ignition system for the engine 2 of FIG. 1) is in an idle or in an actuated or operative condition. If the starting device is activated, the control unit and/or one of plural control units or both or all control units) is (or are) rendered operative (see the block 303). If the control unit(s) is (or are) already operative, such condition remains unchanged when the starting device is turned on. The block 305 indicates the termination of such cycle.

If the determination denoted by the block 302 indicates that the starting device is idle, the next stage of the routine involves a determination (block 304) of the presence or absence of a signal denoting an intended or progressing or completed activity (e.g., an actuation of the brake pedal) by the operator of the vehicle. If the answer is in the affirmative, the control unit(s) is (or are) rendered operative (block 303). On the other hand, if the inquiry denoted by the block 304 is answered in the negative, the routine is terminated at 305.

An important advantage of rendering the control unit(s) 50 operative as early or as expeditiously as possible in the aforedescribed manner and under the aforedescribed circumstances is that it is possible to carry out various operations which can be carried out only when the control unit or units is or are operative without the need for activation of the control unit(s) in a separate step or operation. For example, it is now possible to carry out preparations to ensure reliable operation of various components of or of the entire vehicle such as, for example, the building up of adequate system pressure in the fluid operated device(s) or apparatus. Furthermore, it is possible to carry out a calibration of characteristic lines of various subsystems, such as valves. Still further, it is possible to carry out and memorize adaptions of system-defining parameters with reference to actual parameters. Such system-defining parameters can be those of an actor (such as 15 and/or 60) and/or of one or more aggregates such as the clutch 3 and/or the transmission 4. For example, a parameter which can be adapted is the exact (or at least approximate) point or setting when the clutch begins to transmit torque during adjustment from the fully disengaged condition toward the fully engaged condition.

It is also possible to adapt a synchronizing position, namely a position which certain internal gear shifting or selecting components of the transmission (such as 4) assume when the synchronizing step or operation begins and/or when such step or operation is completed. Still further, it is possible to adapt the end positions of actuating members or elements of the clutch and/or transmission, such as the aforementioned internal gear shifting components of the transmission (4) and/or the disengaging bearing (12) of the clutch (3).

It is also possible to carry out an early calibration of various analog or digital sensors or of sensors which comprise or constitute electric switches and/or to calibrate the end positions of mobile sensors or mobile component parts of sensors. A presently preferred procedure involves intentional or planned movements of the actors (or of certain parts of the actors) to their end positions and an adaption of such end positions by the corresponding elements (sensors) of the monitoring means which is associated with the control unit(s).

Another advantage of the improved method and power train is that the automated component(s) of the power train can be caused to assume a predetermined position or condition (e.g., the clutch 3 of FIG. 1 can assume a fully disengaged condition and/or the transmission 4 of FIG. 1 can be shifted into a particular gear) even before the control unit(s) is (are) rendered operative. Moreover, and if the result of the generation of a signal denoting an activity by the operator of the motor vehicle is an automatic change of the condition of the control unit(s) from inoperative to operative (i.e., as an adjunct to or as a result of an operation or step which need not be carried out for the sole purpose of changing the condition of the control unit or units), it is possible to select a particular condition for the clutch and/or a particular gear for the transmission much earlier than in accordance with prior proposals because the actor or actors can adjust the transmission and/or the clutch without it being necessary to carry out a step or an operation for the sole purpose of rendering the control unit(s) operative, i.e., the control unit(s) can become operative as an adjunct to or as a result of an activity of the operator which is not or need not be carried out for the express or sole purpose of changing the condition of the control unit(s). Early changes of the condition of the control unit(s) need not be beneficial solely for the aforementioned purpose of early adjustment of the clutch and/or transmission by way of the (corresponding) actor or actors but can also permit earlier activation of certain other systems such as the electronic component(s) of an ABS (antiblocking) system for the brake(s), vehicle immobilizing or arresting devices with their own or discrete controls (in lieu of or in addition to manually actuatable parking brakes) and/or others.

An additional advantage of the improved method and power train is that the vehicle need not be provided with discrete means (such as one or more knobs, buttons, levers or the like) for changing the condition of the control unit(s) because such change can be effected automatically in response to expected or necessary (indispensable) activities by the operator of the motor vehicle, such as closing the door next to the driver's seat, occupying the driver's seat, applying a certain force to the gear shifting member 30 and/or others. In other words, it is not necessary to connect the control unit(s) with one or more discrete sensors which are to be actuated (as in accordance with heretofore known proposals) for the sole purpose of changing the condition of the control unit(s). For example, when the operator actuates the brake pedal or the parking brake, this automatically results in the carrying out of one or more steps which, in conventional motor vehicles, necessitate one or more separate operations.

A specific example of the advantages of our improved method and power train is as follows: The operator wishes to avoid a rolling of a parked vehicle along a sloping road surface. To this end, the operator steps on the brake pedal. The ignition system for the engine is still off but the control unit(s) is or are rendered operative so that the actor for the clutch can automatically disengage the clutch before the operator actuates the lever 30 for the purpose of shifting the transmission into a selected gear. The parking brake is thereupon released by the operator or automatically. The engine is started as soon as the operator applies the ignition key so that the starting device can carry out its function.

As indicated in the diagram of FIG. 2, the control unit(s) can remain operative for a certain interval of time following the transmission of a signal denoting an activity by the operator prior to completion of a routine, and the duration of such interval can be predetermined (such as unchanging). The length of the interval can be anywhere between 0.1 second and one or more hours or until the operator decides to open the switch 41 (i.e., to change the condition of the starting device from operative to idle). As already mentioned above, the starting device can be rendered operative (i.e., the switch 41 can be closed) subsequent to a change of the condition of the control unit(s) from inoperative to operative, e.g., in response to a signal denoting a closing of the switch 44 by the brake pedal 44A.

Alternatively, the design of the control unit(s) can be such that the unit or units remains or remain operative only as long as at least one sensor of the monitoring means (such as the switch 44) transmits a signal denoting the corresponding activity or undertaking by the operator of the motor vehicle. As already explained with reference to FIGS. 1 and 2, the control unit(s) can be rendered operative in response to actual carrying out of one or more specific actions and/or in response to detection of an intent to perform a particular function. Thus, the sensor 31 and/or 32 can initiate a change of the condition of the control unit 50 as soon as such sensor detects that the operator has exerted a certain force to the lever 30 and/or that one or more internal components of the transmission 4 have changed their positions to an extent which is indicative of an impending shifting into a different gear or into a particular gear.

It is advisable that a control unit (such as the control unit 50 shown in FIG. 1) carry out a plausibility test prior to changing its condition from inoperative to operative; this is advisable, for example, when the control unit 50 is to change its condition from inoperative to operative in response to a signal which is transmitted by the sensor 31 and/or 32 and denotes that the transmission 4 is likely to be shifted into a different gear, such as into neutral.

At least one of the various sensors can be designed in such a way that it is capable of transmitting a signal denoting an activity or an impending activity by the operator of the motor vehicle while the control unit(s) is or are maintained in the inoperative condition.

It is often desirable to design the controls for the power train in such a way that the control unit(s) is or are rendered operative or remains or remain operative only in response to the transmission of at least one signal denoting a particular activity (or an intent to perform an action) by the operator, and that the control unit(s) is or are rendered inoperative in automatic response to an interruption of the transmission of such signal. Alternatively, and as already mentioned hereinbefore, the control unit(s) can be rendered inoperative after the elapse of a given (fixed or variable) interval following an interruption of transmission of a signal from at least one sensor of the monitoring means which is connected with one or more signal receiving inputs of the control unit(s). The arrangement can be such that the interval is variable but, once selected, remains unchanged until and unless altered by the operator or in a repair shop. For example, the length of the interval during which the control unit(s) remains or remain operative subsequent to an interruption of signal transmission from at least one sensor of the monitoring means can be anywhere between 0.1 second and one or more hours, or until the starting device for the prime mover is turned off.

In accordance with a presently preferred embodiment, the control unit(s) can be rendered operative in response to a signal from at least one of a number of sensors which monitor the position of a brake pedal or a parking (or any other) brake, the opening or closing of a door, the lifting or closing of the hood, the lifting or closing of the trunk cover, the activation or inactivation of an alarm system, the insertion or withdrawal of a door key, the occupying or termination of occupancy of a seat (such as the driver's seat), the depression of the gas pedal, turning on or off the lights and/or the headlamp flasher, activation of the horn, turning on of a radio receiver, actuation of the lever 30, activation of a central locking or blocking system and/or actuation or termination of actuation of any other constituent(s) or component(s) expected to be manipulated by the operator of the motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and, therefore, such adaptations should and are intended to be comprehended within the meaning and range of equivalence of the appended claims.

What is claimed is:

1. A motor vehicle comprising a power train including a prime mover, an automatically actuatable transmission and a torque transmitting system; at least one control unit switchable between an operative condition where the at least one control unit is in an on state and an inoperative condition where the at least one control unit is in an off state; actuating means between said at least one control unit and said transmission to actuate said transmission in the operative condition of said at least one control unit; a starting device for said prime mover, said device having activated and idle conditions and being operative to change a prevailing condition of said at least one control unit in response to a change between said activated and idle conditions; and means for monitoring activities of an operator of the vehicle and for transmitting to said at least one control unit signals effecting a change from the inoperative to the operative condition of said at least one control unit in response to detection of actuation of a brake by the operator.

2. The vehicle of claim 1, wherein said torque transmitting system includes a friction clutch connecting an output element of said prime mover with an input element of said transmission.

3. The vehicle of claim 1, wherein said monitoring means includes a first sensor arranged to transmit said signals and at least one additional sensor.

4. The vehicle of claim 1, wherein said prime mover includes a combustion engine and said starting device includes an ignition system for said engine.

5. The vehicle of claim 1, wherein said torque transmitting system is an automatically actuatable system and further comprising an additional control unit and second actuating means interposed between said additional control unit and said automatically actuatable system to actuate said automatically actuatable system.

6. The vehicle of claim 5, wherein said additional control unit is arranged to actuate said automatically actuatable system by way or said second actuating means in response to signals from said at least one control unit.

7. The vehicle of claim 1, wherein said actuating means is arranged to actuate said transmission in response to the change from the inoperative to the operative condition of said at least one control unit.

8. The vehicle of claim 1, wherein said at least one control unit is arranged to remain in said operative condition for a predetermined interval of time following the change from said inoperative condition in response to transmission of a signal by said monitoring means.

9. The vehicle of claim 1 wherein, in the idle condition of said starting device, said at least one control unit is arranged to remain in said operative condition for a duration of signal transmission by said monitoring means.

10. The vehicle of claim 1, wherein said transmission is manually shiftable into a plurality of gears and a signal which effects the change from the inoperative to the operative condition of said at least one control unit is indicative of manual shifting of said transmission into one of said plurality of gears by the operator of the vehicle.

11. The vehicle of claim 1, wherein said transmission is shiftable into any one of a plurality of gears and a signal which effects the change from the inoperative to the operative condition of said at least one control unit is indicative of the shifted into gear of said transmission.

12. The vehicle of claim 1, wherein said transmission is shiftable into a plurality of gears and said torque transmitting system is an automatically disengageable system, and further comprising additional actuating means for said torque transmitting system, said at least one control unit including means for disengaging said torque transmitting system via said additional actuating means in response to a signal denoting an intention by the operator to shift said transmission.

13. The vehicle of claim 1, wherein said monitoring means includes at least one sensor which is effective to generate signals in the inoperative condition of said at least one control unit.

14. The vehicle of claim 1, wherein said monitoring means includes at least one sensor arranged to transmit signals for a duration of activity of the operator and said at least one control unit remains operative only during transmission of signals by said at least one sensor.

15. The vehicle of claim 1, wherein said monitoring means includes at least one sensor arranged to transmit signals for a duration of activity of the operator and said at least one control unit remains operative during and for intervals following transmission of signals by said at least one sensor.

16. The vehicle of claim 15, wherein said intervals take up predetermined periods of time.

17. The vehicle of claim 1, wherein said monitoring means includes at least one analog sensor.

18. The vehicle of claim 1, wherein said monitoring means includes at least one digital sensor.

19. The vehicle of claim 1, wherein said monitoring means includes at least one switch.

20. The vehicle of claim 1, wherein said monitoring means includes means for generating signals denoting at least one of (a) a condition of a parking brake, (b) a position of a brake pedal, (c) actuation of a door switch, (d) a position of a hood, (e) a position of a trunk cover, (f) a condition of an alarm system, (g) a condition of a seat switch, (h) a position of a gas pedal, (i) a position of a light control switch, (j) a condition of a headlamp flasher, (k) a condition of a horn, (l) a condition of a radio receiver, (m) a position of a gear ratio selecting element for the transmission, and (n) a position or condition of another adjustable constituent of the vehicle.

21. A motor vehicle comprising a power train including a prime mover, an automatically actuatable transmission, a starting device activatable to start the prime mover and an automatically actuatable torque transmitting system; at least one control unit switchable between an operative condition where the at least one control unit is in an on state and an inoperative condition where the at least one control unit is in an off state; first actuating means operating between said at least one control unit and said transmission to actuate transmission in the operative condition of said at least one control unit; second actuating means operating between said at least one control unit and said torque transmitting system to actuate said system in the operative condition of said at least one control unit; and means for monitoring activities of an operator of the vehicle including a first sensor arranged to transmit to said at least one control unit first signals effecting a change from the inoperative to the operative condition of said at least one control unit in response to detection of at least one first activity of the operator including an actuation of a brake, and a second sensor arranged to transmit to said at least one control unit second signals effecting said change from the inoperative to the operative condition of said at least one control unit in response to detection of at least one second activity other than actuation of said brake.

22. The vehicle of claim 21, wherein said torque transmitting system includes an engageable and disengageable friction clutch, said at least one second activity involving a change of a condition of said starting device for said prime mover, said device having activated and idle conditions.

23. The vehicle of claim 22, wherein said prime mover includes a combustion engine and said starting device includes an ignition system for said engine.

24. The vehicle of claim 21, wherein said first actuating means is arranged to actuate said transmission in response to the change from the inoperative to the operative condition of said at least one control unit.

25. The vehicle of claim 24, wherein said at least one control unit is arranged to remain in said operative condition for a predetermined interval of time following the change from said inoperative condition in response to transmission of a signal by said monitoring means.

26. The vehicle of claim 21, wherein said at least one second activity involves a change of a condition of said starting device for said prime mover, said starting device having activated and idle conditions and, in the idle condition of said starting device, said at least one control unit is arranged to remain in said operative condition for a duration of signal transmission by said monitoring means.

27. The vehicle of claim 21, wherein said transmission is manually shiftable into a plurality of gears and a signal which effects the change from the inoperative to the operative condition of said at least one control unit is indicative of manual shifting of said transmission into one of said plurality of gears by the operator of the vehicle.

28. The vehicle of claim 21, wherein said transmission is shiftable into any one of a plurality of gears and a signal which effects the change from the inoperative to the operative condition of said at least one control unit is indicative of the shifted into gear of said transmission.

29. The vehicle of claim 21, wherein said transmission is shiftable into a plurality of gears and said torque transmitting system is an automatically disengageable system, said at least one control unit including means for disengaging said torque transmitting system via said second actuating means in response to a signal denoting an intention by the operator to shift said transmission.

30. The vehicle of claim 21, wherein at least one of said sensors is effective to generate signals in the inoperative condition of said at least one control unit.

31. The vehicle of claim 21, wherein at least one of said sensors is arranged to transmit signals for a duration of activity of the operator and said at least one control unit remains operative only during transmission of signals by said at least one sensor.

32. The vehicle of claim 22, wherein at least one of said sensors is arranged to transmit signals for a duration of activity of the operator and said at least one control unit remains operative during and for intervals following transmission of signals by said at least one sensor.

33. The vehicle of claim 32, wherein said intervals take up pretermined periods of time.

34. The vehicle of claim 21, wherein said monitoring means includes at least one analog sensor.

35. The vehicle of claim 21, wherein said monitoring means includes at least one digital sensor.

36. The vehicle of claim 22, wherein at least one of said sensors includes at least one switch.

37. The vehicle of claim 21, wherein said monitoring means includes sensors for generating signals denoting at least one of (a) a condition of a parking brake, (b) a position of a brake pedal, (c) actuation of a door switch, (d) a position of a hood, (e) a position of a trunk cover, (f) a condition of an alarm system, (e) a condition of a seat switch, (h) a position of a gas pedal, (i) a position of a light control switch, (j) a condition of a headlamp flasher, (k) a condition of a horn, (l) a condition of a radio receiver, (m) a position of a gear ratio selecting element for the transmission, and (n) a position or condition of another adjustable constituent of the vehicle.

38. A method of actuating at least one of an automatically actuatable torque transmitting system and an automatically actuatable transmission system in a power train of a motor vehicle by way of at least one control unit which is switchable between an operative condition where the at least one control unit is in an on state and an inoperative condition where the at least one control unit is in an off state, which is connected with at least one of the systems by at least one actuating means, and which receives signals from sensors arranged to monitor various activities of an operator of the vehicle, comprising the steps of switching the at least one control unit from the inoperative to the operative condition in response to a sensor signal denoting a starting by the operator of a prime mover of the vehicle; and switching the at least one control unit from the inoperative to the operative condition in response to a sensor signal denoting an activity of the operator other than starting of the prime mover.

39. The method of claim 38, wherein said other activity involves the actuation of a brake in the motor vehicle.

* * * * *